March 12, 1957  J. BURNS III  2,784,466
PORTABLE FUMIGATING APPARATUS
Filed Feb. 1, 1952  3 Sheets-Sheet 1
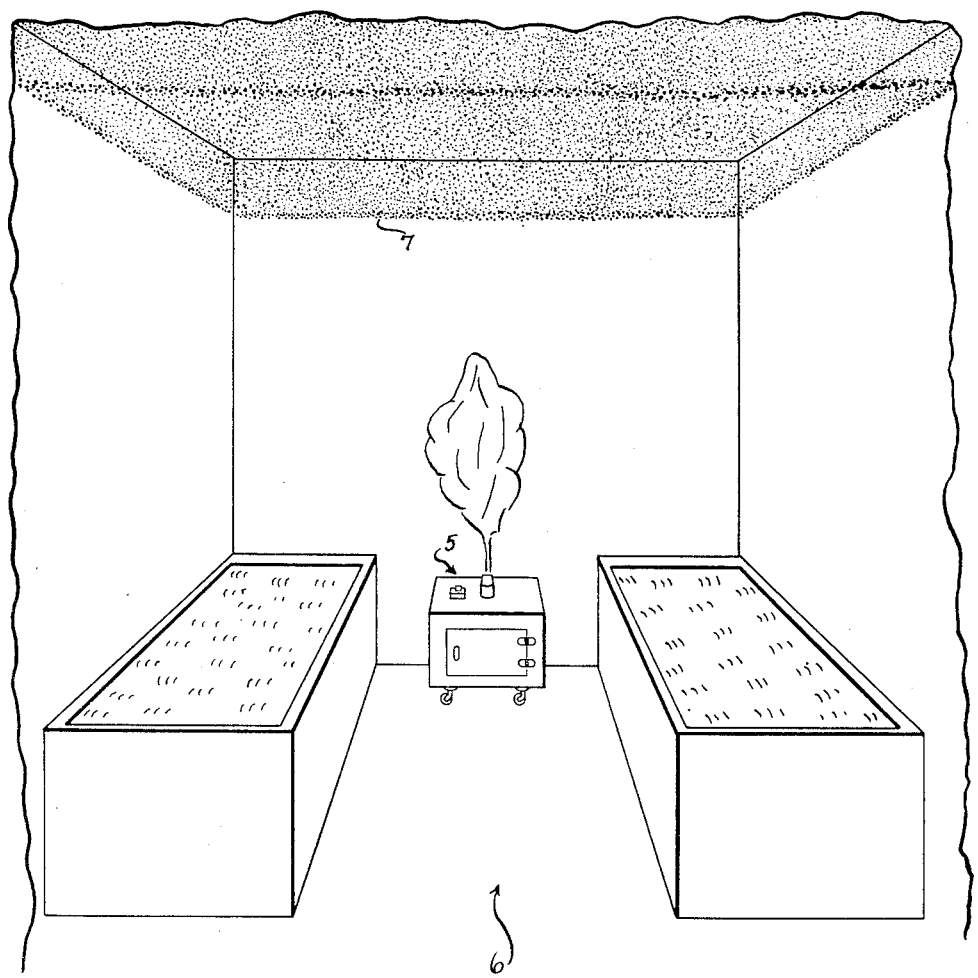

March 12, 1957  J. BURNS III  2,784,466
PORTABLE FUMIGATING APPARATUS
Filed Feb. 1, 1952  3 Sheets-Sheet 2
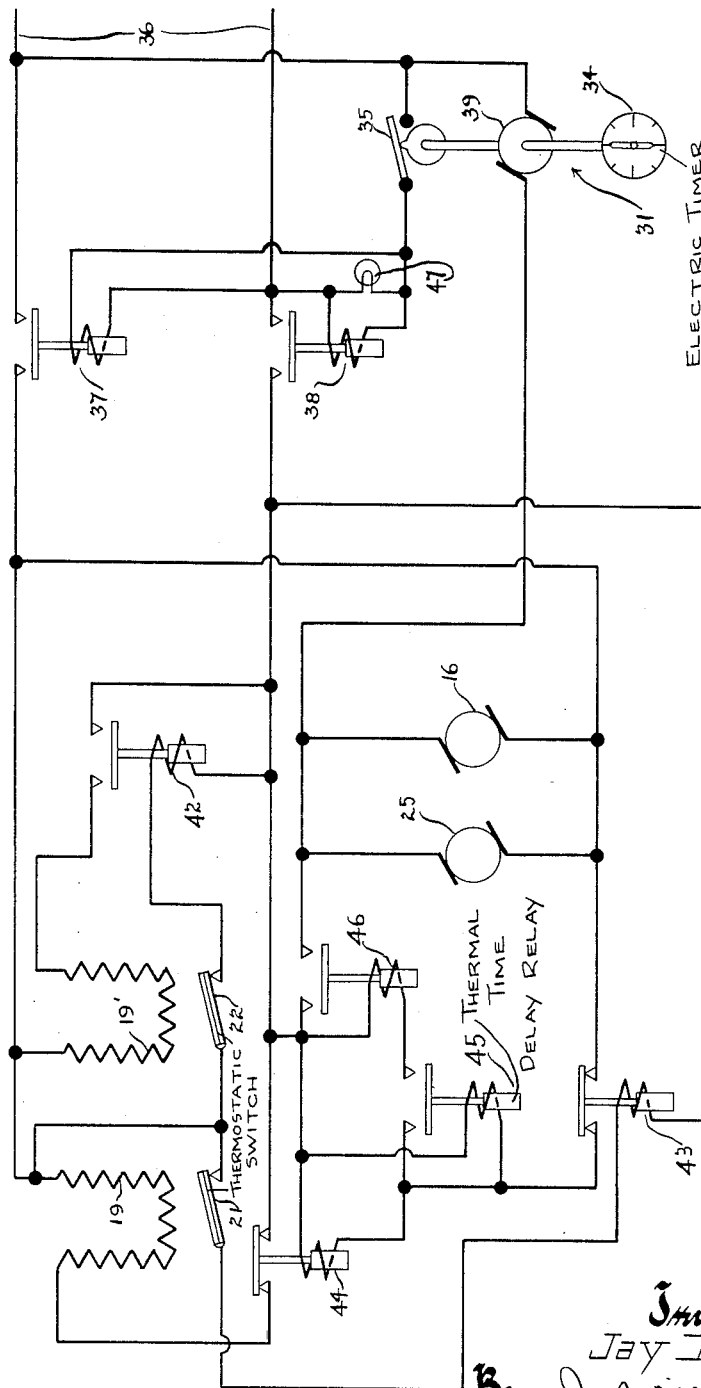

March 12, 1957 J. BURNS III 2,784,466
PORTABLE FUMIGATING APPARATUS
Filed Feb. 1, 1952 3 Sheets-Sheet 3
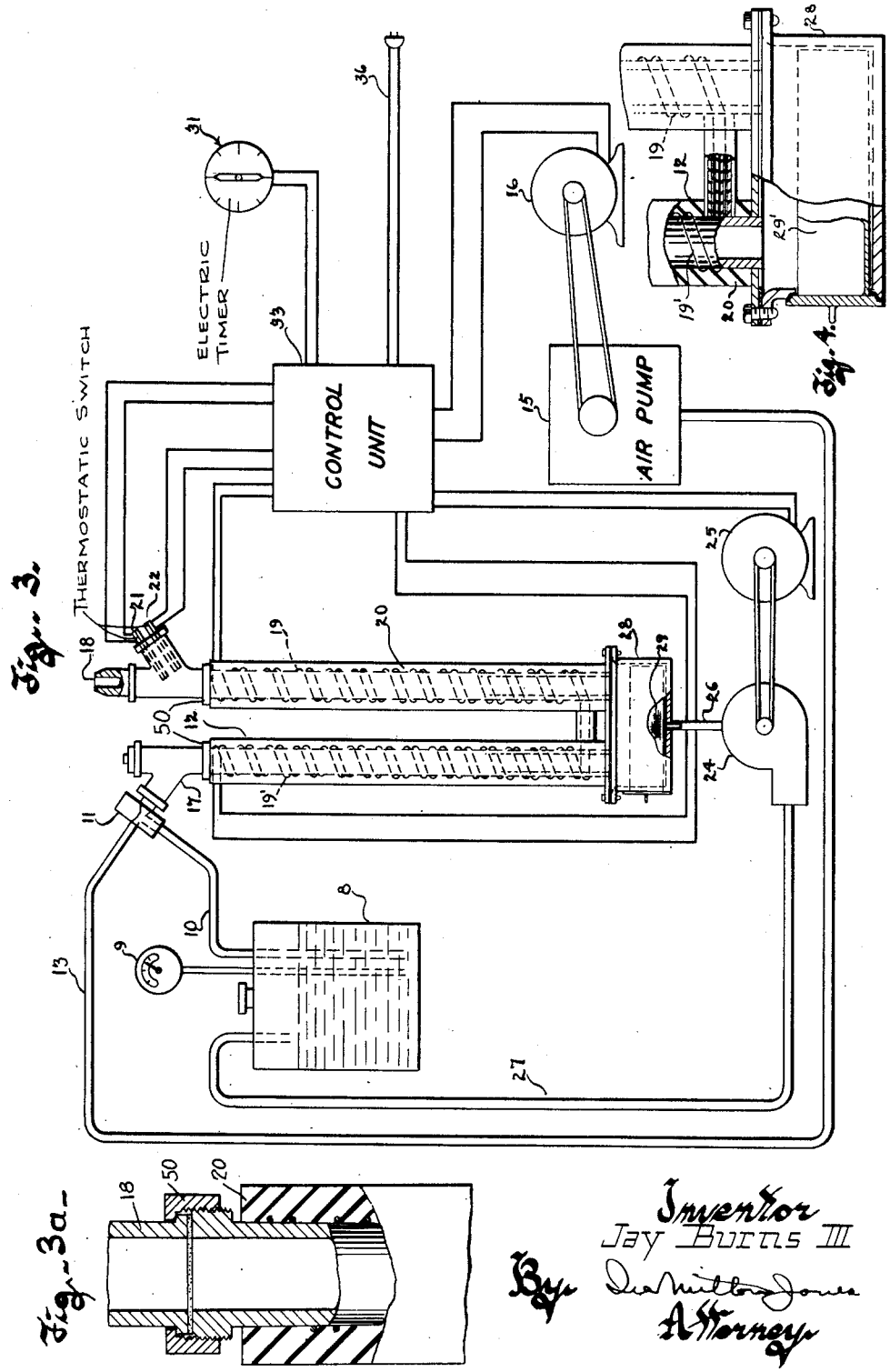

United States Patent Office 2,784,466
Patented Mar. 12, 1957

2,784,466

PORTABLE FUMIGATING APPARATUS

Jay Burns III, Highland Park, Ill.

Application February 1, 1952, Serial No. 269,540

1 Claim. (Cl. 21—123)

This invention relates to fumigating devices and refers more particularly to a portable fumigating unit especially suitable for use in food processing plants and the like.

Flour and bolting mills and similar types of food processing plants must, as a rule, be shut down for fumigation once every six months or even oftener in order to destroy insect pests, rodents and other vermin which normally flourish under the conditions obtaining in such plants. This fumigation process usually entails closing the entire plant for two to three days and necessitates sealing up all of the crevices and outlets to the out-of-doors, releasing cyanide gas or the like through the entire plant, and then airing the plant for at least twenty-four hours to be sure that no traces of the fumigating agent are present to cause ill effects to workmen in the plant.

Obviously, such fumigation methods are costly and inefficient because of the labor lay-off involved and the idle time of expensive plant, machinery and equipment. Consequently it is not economically feasible to fumigate at intervals corresponding to the life cycle of the vermin which must be controlled; hence fumigation is done only when the situation becomes intolerable.

The problem also exists in smaller shops, such as neighborhood bakeries, where it is periodically necessary to sift the entire inventory of flour in order to eliminate insects therefrom.

By contrast, it is an object of this invention to provide a portable fumigating unit which is particularly adapted for fumigating a small plant or for fumigating one room at a time in a large food processing plant so that the entire plant need not be shut down during the fumigating operation; but which, because of its large capacity, is also capable of fumigating a relatively large plant in a single operation.

Another object of this invention resides in the provision of a fumigating unit of the character described which is especially suitable for evaporating an insecticide which is not harmful to human life, and for forming therefrom an aerosol which will readily penetrate into every portion of an enclosure to be fumigated.

A further object of this invention resides in the provision of a fumigating device of the character described having a flash boiler wherein atomized fumigating agent will be evaporated and heated and from which it will be expelled into an enclosure to be treated.

Still another object of this invention is to provide a fumigating device of the character described in which fumigating agent will be delivered to a flash boiler only at times when the temperature in the boiler is sufficiently high to effect complete evaporation of fumigating agent and by which device, moreover, a predetermined quantity of fumigating agent may be dispensed, as determined by the actual time during which fumigating agent is delivered to the flash boiler.

Still another object of this invention is to provide a portable fumigating apparatus of the character described which will have a high capacity, being capable of dispensing sufficient fumigating agent to treat 1,000 cubic feet of space for every minute of operation.

Another object of this invention is to provide a fumigating machine of the character described which will be capable of dependable operation for at least the time required to fumigate an average enclosure without the necessity for shutting it down to clean out clogged orifices or passages.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

Figure 1 is a perspective view of a portion of a room being fumigated by means of the device of this invention;

Figure 2 is a diagram of the electrical control circuit for the portable fumigating unit of this invention;

Figure 3 is a more or less diagrammatic view of the mechanism of the fumigating unit;

Figure 3a is a detail view, partly in elevation and partly in longitudinal section showing the detachable connection between the flash boiler and its inlet and outlet fittings; and Figure 4 is a view of a modified embodiment of the lower portion of the flash boiler or heating unit, shown partly cut away to illustrate detail.

Referring now more particularly to the accompanying drawings, in which like numerals designate like parts throughout the several views, the numeral 5 designates generally the fumigating unit of this invention, which may be installed in any suitable cabinet or mounted on a suitable chassis. The overall dimensions of the apparatus need only be about 20 x 30 x 40 inches; hence it is well adapted to be moved about from place to place within a plant or other structure which requires fumigation from time to time.

The purpose of the several components of the device, and particularly of the controls therefor, is best understood in the light of a discussion of the manner in which it is used. Instead of sealing up an entire plant and fumigating it as a whole, only one room, designated generally by 6, is closed off from the remainder of the building, and the apparatus of this invention is placed therein, filled with a fumigating agent which is preferably such a solution as pyrethrum powder in a light petroleum base. The device is connected with an ordinary 110-volt electrical outlet, and a timing switch control on the cabinet, calibrated in thousands of cubic feet of room space to be fumigated, is adjusted. Thereafter the apparatus needs no further attention.

Setting the timing switch closes a circuit to a pair of electrical heating elements surrounding a heating duct or flash boiler, and after the boiler has reached a sufficiently high temperature to properly evaporate fumigating agent, atomized fumigant is pumped into the boiler where it is converted to a vapor at high temperature and sprayed into the atmosphere of the room as an aerosol. Because of its high temperature the aerosol at once rises to the ceiling of the room, where it spreads out in a relatively thick layer 7, and as it cools it begins to disperse and descend until eventually it reaches room temperature and, being heavier than air, settles to the floor. Thus every portion of the enclosed area will be penetrated by the aerosol during the course of its dispersal and descent, and of course all insect life present in the enclosure will be destroyed thereby.

After the desired quantity of fumigant has been dispensed the mechanism automatically shuts off. Normally, for an enclosure of the size which is most efficiently treated by the device, this will be after less than one hour of operation. About four hours after the unit has been started the room may be opened, and after a very brief airing may be used in the normal manner. Because the aerosol will have largely collected in a relatively shallow zone along the floor of the room it will be readily dispersed and driven out after a short period of ventilation so that personnel may then enter the room without any discomfort.

The mechanism of the device of this invention is illustrated in Figure 3, wherein the numeral 8 designates a reservoir or tank adapted to hold fumigating agent such as pyrethrum in a light petroleum oil. The tank may be formed of any of a number of different materials since most of the insecticides suitable for use with this apparatus will not react with such materials as might ordinarily be used for the tank. A suitable liquid level gage 9 on the tank indicates the extent to which it is filled with fumigant. An outlet conduit 10 from the tank communicates with one of the inlets of a venturi-type eductor 11 which debouches into the inlet of a flash boiler or heating duct 12. The other inlet of the eductor is communicated by means of a conduit 13 with the outlet of an air pump 15 actuated by an electric motor 16. It will be seen that when the pump is in operation fumigant will be withdrawn from the tank and sprayed out of the eductor into the flash boiler in atomized condition, and it is propelled through the boiler at relatively high speed. The flash boiler is a substantially U-shaped duct with its legs extending vertically upward, the inlet 17 being at the top of one of the legs of the U while the outlet fitting 18 is at the top of the other leg of the U. Thus, atomized spray is compelled to pass through the entire length of the heating duct, and because the spray is propelled at high speed by the pump the outlet fitting 18 can have a relatively large orifice, so that it is unlikely to become clogged.

Like the tank 8, the heating duct may be formed of any suitable material, including brass, ferrous metal and Pyrex glass. The inlet connection and the outlet fitting are preferably readily detachably connected to the body of the heating duct by any of the well known means which will readily occur to those skilled in the art, as for example by means of a suitably threaded and flanged collar 50 (see Figure 3a).

The heating duct is surrounded by coiled resistance type electrical heating elements 19 and 19' which, in turn, are covered by an insulative jacket 20, such as an asbestos cloth wrapping. A pair of temperature responsive switches 21 and 22 are mounted in the outlet fitting so as to be operatively affected by the temperature of the aerosol being expelled from the duct.

Since it can be expected that a certain amount of liquid fumigating agent will collect in the bight of the U, especially during periods when the duct temperature momentarily falls below that necessary for complete evaporation of the fumigant, a scavenge pump 24, driven by an electric motor 25, may be provided, with its inlet communicated with the bottom of the heating duct by means of a conduit 26, while its outlet discharges through another conduit 27 back into the tank 8.

Since any accumulation of non-volatile fumigant residue will tend to gather at the bottom of the heating duct the bight of the U comprises a chamber 28 provided with a clean-out drawer 29. When a scavenge pump is used this drawer comprises screen material (except, of course, for its outer wall) to enable the liquid fumigant to pass into the conduit 26, while solid or gummy material is retained in the drawer. When no sump pump is employed, the clean-out drawer 29' (see Figure 4) has imperforate walls, and the nonvolatile material collects therein. When the inlet connection 17 and the outlet fitting 18 are removed, a wire brush may be passed down into the legs of the heating duct to clean off the accumulations of carbonized and gummy fumigant residue which normally collect on their inner surfaces. This material falls into the clean-out drawer, whence it may be readily removed.

Operation of the two motors 16 and 25 and of the two heating elements 19 is governed generally by an electrical timer 31 and by an electrical control mechanism 33 in series with the timer.

The control mechanism is diagrammed in Figure 2 and comprises generally the two thermostatic switches 21 and 22, the timer 31, a plurality of relays, and the necessary conductors to connect these elements in circuit with one another and with a current source 36. The timer has a manual control 34 which enables the desired fumigation time to be preset, but it is calibrated in terms of thousands of cubic feet of space to be fumigated rather than in terms of time, since the quantity of fumigant expelled by the apparatus is directly related to the time during which it operates. The timer control 34 closes a switch 35, but the switch is actuated to its open position by an electric motor 39 after said motor has operated for the period of time determined by the setting of the manual control 34. The circuit for control of the timer motor will be discussed presently.

Upon closure of the switch 35 in response to adjustment of the manual timer control 34, a circuit is completed from the source of current 36 to a pair of relays 37 and 38 which are connected in parallel with one another and which are normally open, i. e., open when not energized. These relays serve in effect as a double-pole master switch to make and break both sides of the current supply line to the remainder of the circuit at the dictation of the timer switch.

Two heating elements are employed, one of which, 19, preferably has a higher heating capacity than the other element 19'; for example, the elements may be rated at 1500 watts and 1000 watts, respectively. Each of the heating elements is controlled by one of the thermostatic switches, the element 19 being controlled by the switch 21 and the element 19' being controlled by the switch 22. These switches may be of the well known bimetallic type and because of the necessity for keeping them small and compact, in view of their location in the outlet fitting, they preferably control the heating elements through relays. The thermostatic switch 21 is set to open at a temperature high enough so that the atomized fumigant sprayed into the coil will emerge as a heated vapor. The bimetallic switch 22 is adjusted to open at a higher temperature, slightly below the flash point or the disintegration temperature of the fumigant, whichever is lower.

Upon closure of the time switch 35 and the master relays 37 and 38 the heating duct will normally be cold and the thermostatic switches 21 and 22 will therefore be closed. Connected in series with the bimetallic switch 22 is a normally open relay 42 which, when energized, completes a circuit through the small capacity heating coil 19', connecting it with the power source. At the same time, a normally closed relay 43, in series with the bimetallic switch 21 which controls the larger capacity heating coil 19, is also energized and breaks a circuit which includes another normally closed relay 44. The relay 44, so long as it remains closed, connects the larger capacity coil 19 in the power circuit and thus both heating coils will be energized so long as the two thermostatic switches 21 and 22 are closed, i. e., so long as the duct temperature is below that at which the fumigant vaporizes.

When the temperature in the heating duct attains a value at which the switch 21 will open, the relay 43 in series therewith will, of course, be de-energized and will close, thereby closing a circuit to the relay 44 which, like the relay 43, is biased to its open position when energized. Opening of the relay 44 will, of course, break the circuit to the heating coil 19 and current will cease to flow therethrough so that the duct will be heated only by the low capacity coil 19'.

Simultaneously with the opening of the relay 44, closure of the relay 43 will effect energization of a time delay relay 45 which is connected in parallel with the relay 44 and which closes a predetermined period of time after it is energized. The relay 45 may be any suitable type of time delay relay but is preferably of the thermal type and is set for a delay interval of about five seconds. A relay 46, which is energized upon closure of the time delay relay, closes to complete a circuit to the three motors, namely, the air pump motor 16, the scavenger pump motor 25 and the timer motor 39. It will thus be seen that when the temperature in the heating duct reaches the proper value for evaporation of atomized fumigant, the high capacity heating coil will automatically shut off and after a delay interval of a few seconds the air pump and scavenger pump will begin to operate and at the same time the timer motor will start. Thus the timer motor operates only when the pump motors are running so that the operating interval defined by the timing switch will be the actual time during which fumigant is being expelled from the machine. The time delay relay 45 prevents frequent stopping and starting of the motors during periods of rapid temperature fluctuation in the critical range of the thermal switch 21.

Should the temperature in the heating duct continue to rise to the point where it reaches the value at which the switch 22 will open, opening of that switch will de-energize the relay 42 and thus break the circuit to the small heating coil 19' so that neither coil will be in operation until the duct temperature returns to a value at which the switch 22 will close, whereupon the coil 19' will again be energized. Should the temperature in the heating duct fall below the value at which the switch 21 is open, that switch will close and the cycle of operations involving the relays 43, 44, 45 and 46 will be reversed, stopping the operation of the motors. More specifically, reclosure of the bimetallic switch 21 in response to a decrease in duct temperature will energize and open the relay 43, thereby de-energizing the relay 44 (which closes the circuit to the coil 19) and simultaneously opening the time delay relay 45 and thus the relay 46 which controls the motor circuits.

At the conclusion of the fumigating interval determined by the setting of the manual control 34, the timing motor 39 will open the timing switch 35 and this in turn will de-energize the master relays 37 and 38, thereby halting all further operation of the machine. A pilot light 47 may be wired in parallel with one of the master relays 38 to indicate the termination of the preset period of operation of the machine.

From the foregoing description, taken together with the accompanying drawings, it will be readily apparent that this invention provides a high capacity, compact, portable fumigating unit which is especially adapted for use in food processing plants and the like and which will dependably operate to fumigate an entire enclosure in which it is located for a period of actual operating time corresponding to the volume of the enclosure.

What I claim as my invention is:

A portable fumigating apparatus for discharging pyrethrum powder in a light petroleum base, or similar liquid fumigant, in the form of a vaporous aerosol, said apparatus comprising: an electric air pump; a vessel for holding a supply of liquid fumigant; a heating duct comprising a pair of substantially upright tubes communicated with one another by chamber defining means beneath said tubes including a removable drawer to which both of said tubes open at their bottoms, one of said tubes being open to the atmosphere at its top to provide an unrestricted outlet from the heating duct; a venturi-type eductor having its outlet debouching into the upper end of the other of said tubes, said eductor also having a suction inlet communicated with the inlet of the vessel and a pressure inlet communicated with the outlet of the air pump so that air from the air pump will educt liquid fumigant from the vessel and spray atomized fumigant into the heating duct for circulation therethrough and for discharge through the outlet of the heating duct in the form of a vaporous aerosol; a pair of electric heating elements, each extending along a substantial portion of the length of the duct to heat atomized fumigant circulated through the duct and cause the same to evaporate and emerge from the outlet as a heated aerosol; thermostatic switch means responsive to changes of temperature in said heating duct; means including circuit means controlled by said thermostatic switch means for individually connecting said heating elements with a source of current, whereby both of said heating elements are normally connected with said source of current, said thermostatic switch means being set so that a rise of temperature of the duct to a predetermined level will disconnect one of said heating elements from the current source and a rise of said temperature to a higher predetermined level will disconnect another of said heating elements from the current source; and means including circuit means controlled by said thermostatic switch means for connecting the pump in circuit with the source of current upon disconnection of the first-named heating element from said source of current.

References Cited in the file of this patent

UNITED STATES PATENTS

| | | |
|---|---|---|
| 462,608 | Wassmuth | Nov. 3, 1891 |
| 1,775,703 | Stokes | Sept. 16, 1930 |
| 2,360,071 | Noll | Oct. 10, 1944 |
| 2,467,425 | Cobb | Apr. 19, 1949 |
| 2,472,011 | Graham | May 31, 1949 |
| 2,497,068 | Canney | Feb. 14, 1950 |
| 2,523,371 | Jennings et al. | Sept. 26, 1950 |
| 2,523,373 | Jennings et al. | Sept. 26, 1950 |
| 2,537,761 | Howard | Jan. 9, 1951 |

FOREIGN PATENTS

| | | |
|---|---|---|
| 461,861 | Germany | June 28, 1928 |
| 437,160 | Great Britain | Oct. 24, 1935 |